United States Patent
Akahane

(10) Patent No.: US 6,536,474 B2
(45) Date of Patent: Mar. 25, 2003

(54) AIR CONDITIONER UNIT FOR VEHICLE

(75) Inventor: Masaru Akahane, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 141 days.

(21) Appl. No.: 09/794,009

(22) Filed: Feb. 28, 2001

(65) Prior Publication Data
US 2001/0021635 A1 Sep. 13, 2001

(30) Foreign Application Priority Data

Mar. 13, 2000 (JP) ........................................ 2000-068923
Mar. 27, 2000 (JP) ........................................ 2000-086804

(51) Int. Cl.[7] ............................................. F16K 11/074
(52) U.S. Cl. .................................. 137/625.44; 454/156
(58) Field of Search ..................... 137/625.44; 454/156, 454/123, 69

(56) References Cited

U.S. PATENT DOCUMENTS

| | | | | |
|---|---|---|---|---|
| 3,994,335 A | * | 11/1976 | Perkins ........................ | 165/103 |
| 4,940,083 A | * | 7/1990 | Takenaka et al. .............. | 165/42 |
| 6,138,749 A | * | 10/2000 | Kawai et al. ................... | 454/1 |
| 6,351,961 B1 | * | 5/2002 | Kurokawa et al. .......... | 454/156 |

FOREIGN PATENT DOCUMENTS

JP          8-104126          4/1996

* cited by examiner

Primary Examiner—John Fox
(74) Attorney, Agent, or Firm—Foley & Lardner

(57) ABSTRACT

A casing unit of an air conditioner for a vehicle includes a casing, a partition plate, a bearing portion and a door unit. The casing has a first casing member and a second casing member. The partition plate is installed in the casing. The bearing portion is formed at a periphery of said partition plate and a C-shaped cross section having an opening. The door unit has a shaft and a plurality of doors integral to the shaft. The shaft is rotatably installed to the bearing portion.

9 Claims, 7 Drawing Sheets

AIR CONDITIONER UNIT FOR VEHICLE

BACKGROUND OF THE INVENTION

The present invention relates to an air conditioner unit for a vehicle, and more particularly to a casing structure of an air conditioner for a vehicle.

Some of vehicular air conditioner units are arranged to supply independently conditioned airs to right and left areas near front seats, respectively. Such an air conditioner unit is generally requested to be compact. In order to satisfy such request, it is preferable to provide a plurality of blending portions for blending hot air and cool air in a casing unit. This arrangement enables the air conditioner to deliver conditioned air to the plural areas in a vehicle compartment. In order to provide a plurality of portions for blending hot air and cool air in a casing unit of the air conditioner unit, it is necessary to provide at least one partition plate for defining independent passages in the casing so as to supply independently blended air to the passages passes, respectively. A plurality of doors such as mode doors for varying airflow passing through the respective passages are installed to the respective passages. Generally, a mode door is a door for opening and closing a blowing-out port opened at the casing directed toward a passenger compartment and includes a VENT outlet and a foot outlet. Further, the thus arranged conventional unit for independently conditioning and delivering air by each independent passage is called an independent air conditioner unit. A unit for supplying same conditioned air to right and left areas is called a standard air conditioner unit. With the independent air conditioner unit, it becomes possible to deliver differently conditioned airs to right and left areas of front seats in a vehicle passenger compartment, respectively. This conventional independent air conditioner unit is generally arranged to install a partition plate in a casing of the unit for the purpose of defining the plural independent passages. Therefore, it is necessary to provide linked doors connected with each other while locating the partition plate therebetween. As shown in FIG. 10, such linked doors 101 and 102 are installed to a partition plate 103 in a manner of sandwiching the partition plate 103 with shafts 111 and 112 of the linked doors 101 and 102 and engaging the shafts 111 and 112.

However, this installation structure requires plural parts for the linked doors, and therefore the production cost thereof is increased. On the other hand, even if the linked doors are integrally formed into one piece, it is necessary to provide an installation slot for the integrally formed doors at the partition plate. However, this slot degrades a partition performance of the partition plate for the respective passages.

Further, the partition plate is generally positioned in the casing by being sandwiched by a pair of casing members as shown in FIG. 11. More specifically, a Japanese Patent Provisional Publication No. H8-104126 discloses a partition plate positioning structure of an air conditioner unit. Case connecting portions 241 and 242 of the casing members are formed into a flanged shape as shown in FIG. 11. Further, both casing members have stepped portions 241a and 242a for defining a partition plate positioning groove to which a peripheral portion of the partition plate is inserted.

However, it is necessary to further increase thickness of the connecting portions 241 and 242 according to the provision of such stepped portions 241a and 242a. This may degrade a quality of the molding of the casing member while increasing the quantity of plastic resin for molding the casing. Furthermore, this conventional structure is not so suitable in view of assembling the casing and the partition plate.

SUMMARY OF THE INVENTION

It is therefore an object of the present invention to provide a casing unit which is for a vehicular independent air conditioner unit and enables decreasing a production cost thereof and improving an assembly easiness.

An aspect of the present invention resides in a casing unit which is of an air conditioner for a vehicle and comprises a casing, a partition plate, a bearing portion, and a door unit. The casing comprises a first casing member and a second casing member. The partition plate is installed in the casing. The bearing portion is formed at a periphery of said partition plate and a C-shaped cross section having an opening. The door unit comprises a shaft and a plurality of doors integral to the shaft. The shaft is rotatably installed to the bearing portion.

Another aspect of the present invention resides in a casing unit which is of an air conditioner for a vehicle and comprises a casing, a partition plate and partition plate supporting portions. The casing comprises a first casing member and a second casing member. The partition plate in installed in the casing. The partition plate supporting portions are integrally formed with the first and second casing members, respectively and sandwich a peripheral portion of said partition plate.

DETAILED DESCRIPTION OF THE INVENTION

Referring to FIGS. 1 to 9, there is shown an embodiment of an air conditioner unit for a vehicle in accordance with the present invention.

Figure 1:
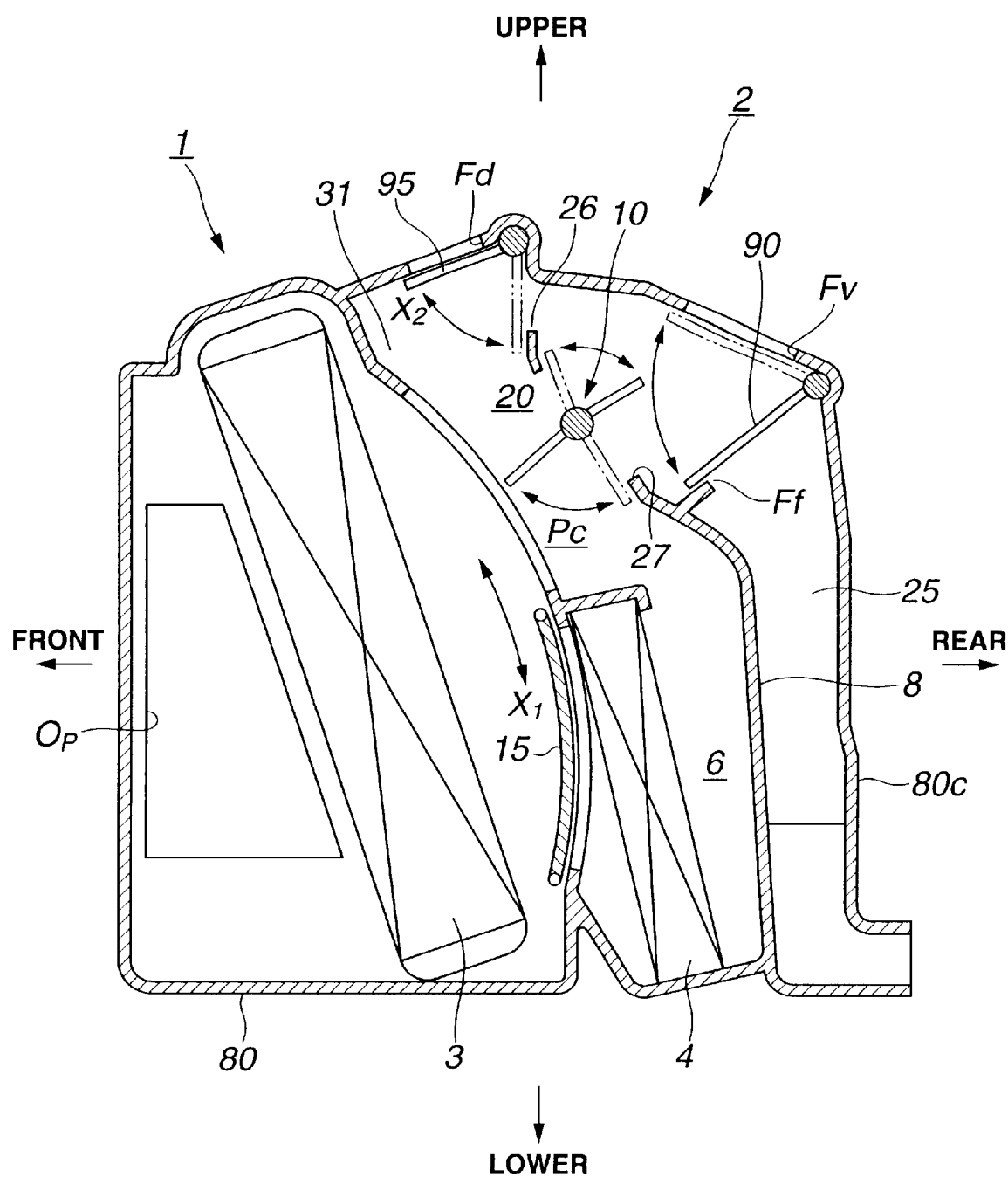
FIG. 1 is a cross-sectional view showing an air conditioner according to an embodiment of the present invention.

As shown in FIG. 1, the air conditioner unit is of a vertically arranged type and is usually installed in an instrument panel of the vehicle. The air conditioner unit comprises a cooler unit 1 and a heater unit 2 which are integrally assembled in a casing 80. The casing 80 is configured into a short dimension form in the longitudinal (horizontal) direction of the vehicle.

An evaporator 3 is disposed in an upstream (front side) air passage in the casing 80, and a heater core 4 is disposed in a downstream (rear side) air passage in the casing 80. As is well known, the evaporator 3 employed in the air conditioner unit is a device for cooling induction air by heat transfer with refrigerant in a manner of flowing a low-temperature low-pressure refrigerant decompressed by an expansion valve in the evaporator 3. Further, the heater core 4 employed in the air conditioner unit is a device for heating induction air by heat transfer with engine coolant in a manner of flowing the engine coolant in the heater core 4.

The air for air conditioning is inducted from an inlet port Op opened toward a vehicle lateral direction corresponding to the perpendicular direction to a paper surface of FIG. 1 into the casing 80. Then, the induction air is directed toward the right and upper side (corresponding to the rearward of the vehicle in FIG. 1 to be cooled by the evaporator 3.

An air intake unit (not shown) is installed to the lateral side of the casing 80 and inducts air to the inlet port Op. This arrangement contributes to shorten the longitudinal dimension (the dimension in the vehicle lateral direction) of air conditioner unit.

A mix door 15 is installed at a portion between the evaporator 3 and the heater core 4 so as to be slidable in the direction of the arrows X1 of FIG. 1. Therefore, the induction air from the upstream passage is selectively and dividedly flowed to a hot air passage 6 passing through the heater core 4 and to a cool air passage Pc bypassing the heater core 4 according to the positioning of the mix door 15. This arrangement of the mix door 15 enables the evaporator 3 and the heater core 4 to locate adjacently, and therefore the space of the air conditioner unit is further decreased.

The mix door 15 is formed into an arc shape so as to extend along the direction of the arrow Xl while curving so as to project toward a downstream side with a predetermined curvature as shown in FIG. 1. The thus shaped mix door 15 is capable of smoothly varying the flow direction of the air cooled by the evaporator 3 so as to direct along the arc-shaped surface of the mix door 15 to the cool air passage Pc or to direct along the arc-shaped surface of the mix door 15 to the hot air passage 6.

A door sliding mechanism for sliding the mix door 15 is constituted by teeth portions formed in the vicinity of both end portions of the mix door 15, a pair of gears meshed with the teeth portions, and a motor for rotating the gears. It will be understood that the door sliding mechanism is not limited to this structure and may employ a manual operation mechanism arranged to slide the mix door 15 by manually pulling and pushing a wire cable connected to the mix door 16.

The casing 80 comprises an upper chamber 20 adjacent to the cool air passage Pc as shown in FIG. 1. The upper chamber 20 has a VENT outlet port (ventilation outlet) Fv and a DEF outlet port (defroster outlet) Fd. A wall portion 8 is provided at a downstream side of the heater core 4 and therefore the hot air passing through the hot air passage 6 is flowed upward along the wall portion 8 to the upper chamber 20. Accordingly, the hot air is mixed with the cool air reached to the cool air passage Pc.

Further, an outer wall 80c and the wall portion 8 define a foot air passage 25 which extends downward from the upper chamber 20 through a foot outlet port Ff. A VENT door (ventilation door) 90 is installed at an inlet portion of the foot air passage 25 so as to be capable of controlling the openings of the vent outlet port Fv and the foot outlet port Ff. In order to adapt to a condition that both the VENT outlet port Fv and the foot outlet port Ff are closed, a DEF door (defroster door) 95 provided at the defroster outlet port Ff is arranged to open and close a first opening portion 26 communicated with the DEF outlet port Fd, the VENT outlet port Fv and the foot outlet port Ff. Of course, the present invention is not limited to this, and instead of this arrangement, it may be arranged such that a foot door for controlling the opening of the foot outlet port Ff is independently provided at a downstream side of the foot air passage and that the VENT door 90 is arranged to control the opening of the vent outlet port Fv.

A multiple mode door 10 is swingably provided in the upper chamber 20 located at downstream side of the cool air passage Pc and the hot air passage 6. The multiple mode door 10 acts as a guide member for guiding air to an upper portion in the upper chamber 20. The multiple mode door 10 is capable of opening and closing a second opening portion 27 provided between the wall portion 8 and the first opening portion 26.

The air inducted from the induction port Op is cooled by the evaporator 3 and divided into upper airflow and lower airflow by the mix door 15. The lower airflow is heated by the heater core 3 and supplied to the hot air passage 6. The upper airflow cooled by the evaporator 3 bypasses the heater core 4 and is supplied to the cool air passage Pc. The cool air is mixed with the hot air passing through the heater core 4 at the upper chamber 20. The mixed air set at a predetermined temperature is supplied to the passenger compartment through the various outlet ports F including the VENT outlet port Fv, the DEF outlet port Fd, and the foot outlet port Ff according to the selected air supply mode. In some cases, the hot air or cool air is directly supplied to the passenger compartment without being mixed with each other.

The temperature of the air blown out from the outlet ports F is basically controlled by controlling the opening of the mix door 15. The air supply mode includes a VENT mode for blowing out the cool air to an upper side of a vehicle passenger, a bi-level mode for blowing out the cool air to the upper side of the vehicle passenger and blowing out the hot air to a lower side of the vehicle passenger so as to keep the head cool and the feet warm, a DEF mode for clearing the clouding of front and side windows, a foot mode for blowing out the conditioned air to the lower side of the vehicle passenger, and a DEF-foot mode for clearing the windows and blowing out the hot air to the lower side of the vehicle passenger.

When a multiple mode such as the bi-level mode or DEF-foot mode is selected, by rotating the multiple mode door 10 from the second opening portion 27 toward the closed position, the air fed from the cool air passage Pc and the hot air passage 6 is fed to the further upper portion in the upper chamber 20. Accordingly, the hot air and the cool air are mixed and raised up by means of the multiple mode door 10. Further, the mixed air is gathered at the upper portion of the upper chamber 20 and is distributed. Therefore, a U-turn passage, which enables the mixing of the hot air and the cool air to be sufficiently promoted, is provided, and therefore the air mixing performance is improved. With this arrangement, it becomes possible to properly adjust the temperature of the blown-out air by the air mixing operation. Therefore, the amenity of the passenger compartment is further improved.

On the other hand, when a full cool temperature setting is selected, that is, when all of cool air cooled by the evaporator 4 is blown through the cool air passage Pc to the passenger compartment, the multiple mode door 10 is rotated on a shaft and set at a position shown by continuous line in FIG. 1. At this setting of the multiple mode door 10 at the position, the cool air smoothly flows from the cool air passage Pc to the vent outlet port Fv. Accordingly, when the full cool operation is executed, the cool air passed the cool air passage Pc smoothly flows along the multiple mode door 10, and is blown from the VENT outlet port Fv to the passenger compartment. That is, the airflow resistance during this full cool operation is small and lot of cool air is supplied to the passenger compartment. Consequently, the cooling performance of the air conditioner unit is improved.

Figure 2:
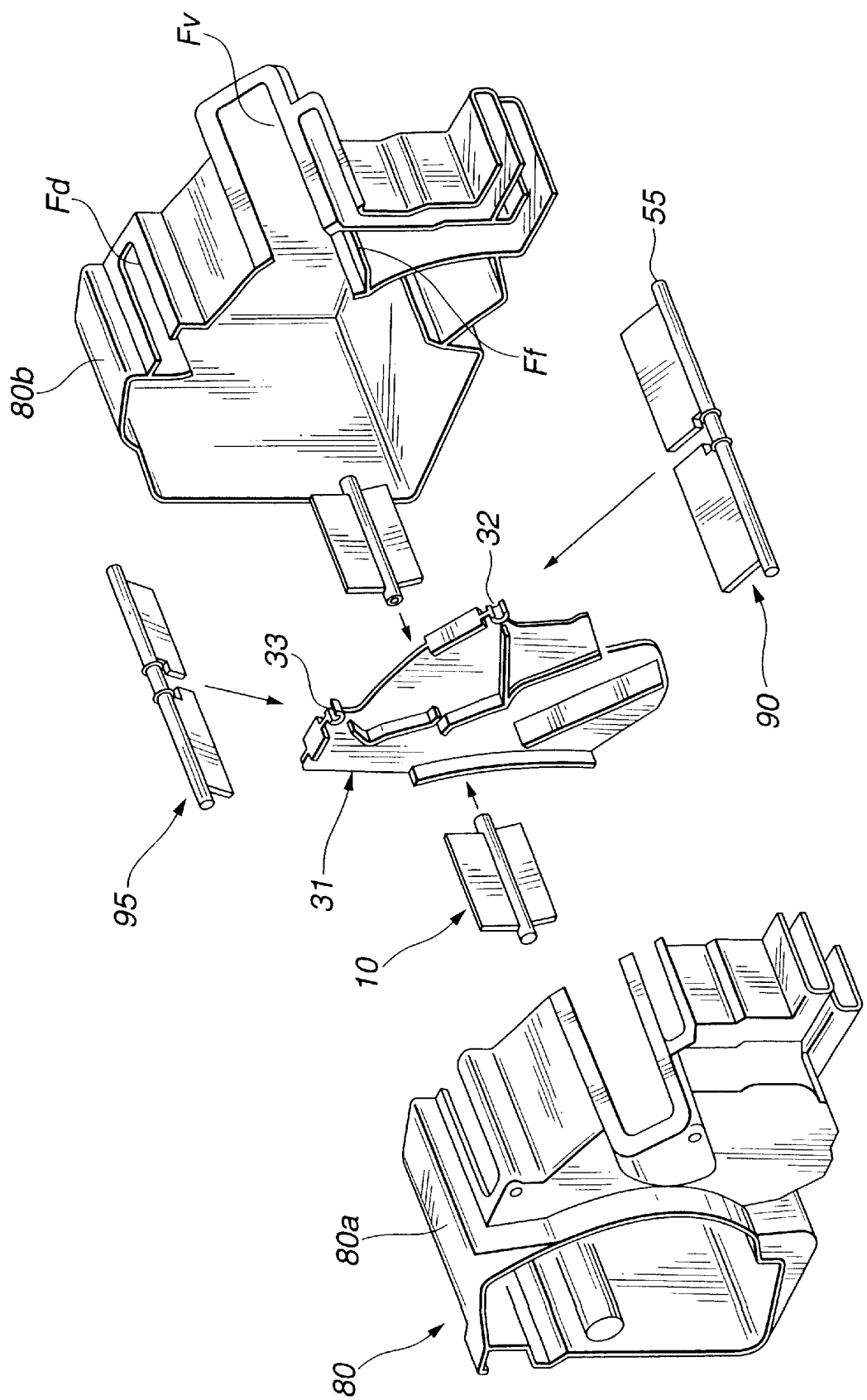
FIG. 2 is an exploded perspective view showing main parts of a casing unit of FIG. 1.

FIG. 2 shows an exploded perspective view showing essential parts of the conditioner unit according to the present invention. As shown in FIG. 2, a space in the casing 80 of the air conditioner unit is divided into independent two passages by a partition plate 31 so that the temperature control can be executed at each independent passage. The casing 80 is constructed by the partition plate 31 and a pair of casing members 80a and 80b divided into left and right as shown in FIG. 2. The casing members 80a and 80b are connected with each other while locating the partition plate 31 therebetween. Therefore, the partition plate 31 is provided along the airflow flowing in the casing 80. The partition plate 31 extends toward the downstream passage and equivalently divides the downstream passage into independent two passages. The divided two passages supply conditioned air to the right and left areas of the front portion in the passenger compartment.

The mix door 15 is constituted by two door portions which are disposed in the vicinity of the inlets of the independent two passages, respectively. Each door portion of the mix door 15 is arranged to independently operate by each door sliding mechanism (not shown). Accordingly, the temperature of the air in each passage can be independently controlled so as to be able to control the opening of each inlet independently. That is, it becomes possible to generate two independently conditioned airflows in one air conditioner unit. The thus arranged air conditioner unit is capable of supplying two differently controlled airflows (hot air and cool air are independently mixed respectively) to the right and left areas of the front seats, respectively.

Figure 3:
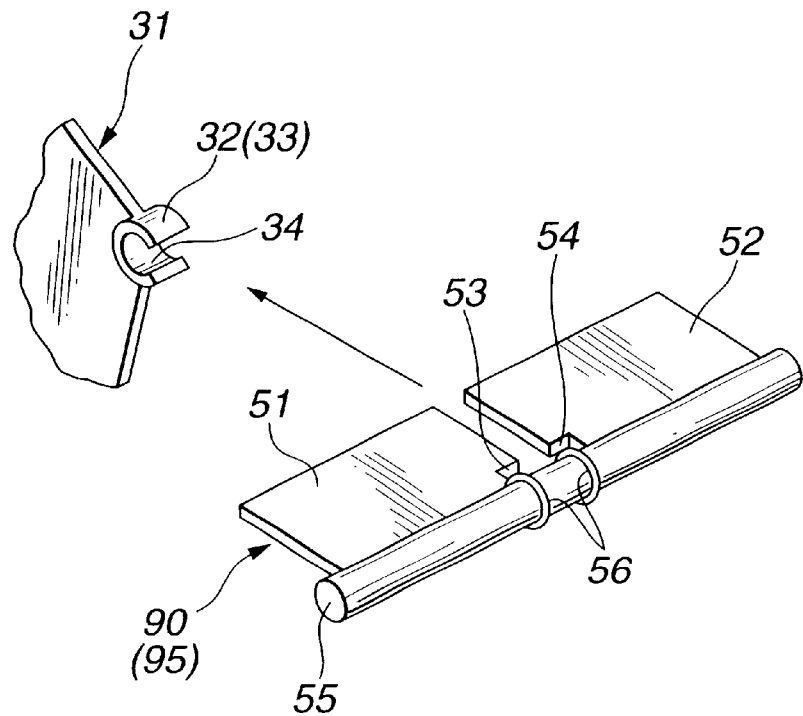
FIG. 3 is an enlarged and exploded perspective view of a partition plate and a VENT door of FIG. 2.
Figure 4:
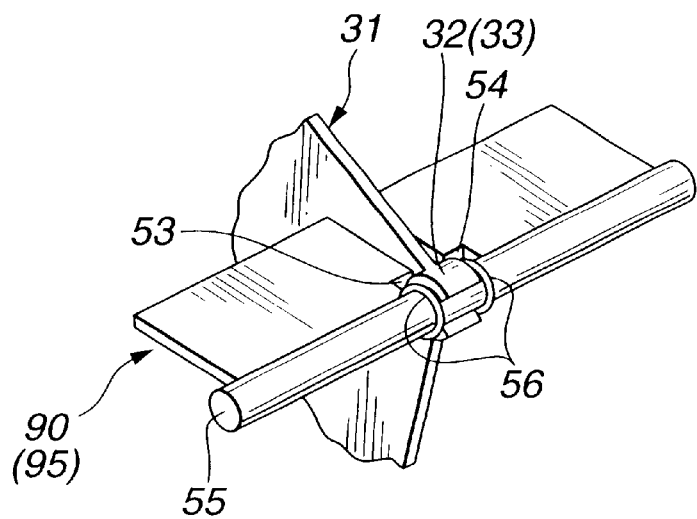
FIG. 4 is an enlarged perspective view showing an assembled condition of the partition plate and the VENT door of FIG. 3.

FIGS. 3 and 4 show the VENT door 90 and a VENT-door supporting portion of the partition wall 31. The partition plate 31 has a bearing portion 32 for the VENT door 90 and a bearing portion 33 for the DEF door 95. Each of the bearing portions 32 and 33 is formed into a C-shaped cross section and has an opening portion through which a shaft 55 of each of the VENT door 90 and the DEF door 95 is rotatably installed to the partition wall 31.

Hereinafter, the construction of the bearing portion 32 and the VENT door 90 will be discussed with reference to FIGS. 3 and 4. Since the construction of the bearing portion 33 and the DEF door 95 are basically the same as that of the bearing portion 32 and the VENT door 90, the explanation thereof is omitted herein.

The bearing portion 32 has a semi-cylinder portion extending in the direction perpendicular to a surface of the partition plate 31. The bearing portion 32 is arranged so that the part of the bearing portion 32 is greater than the opening while enabling the shaft 55 of the VENT door 90 to be installed to the partition plate 31 through the opening. In other words, an arc surface 34 formed by the bearing portion 32 has an angle subtended at a center of the arc which angle is greater than 180°.

The VENT door 90 comprises the shaft 55 supported to the bearing portion 32 and a pair of doors 51 and 52 fixed to the shaft 55. The doors 51 and 52 are formed to have a cutout portion corresponding to the partition plate 31 therebetween. The VENT door 90 is a one-piece structure formed by means of the integral molding using synthetic resin. The doors 51 and 52 are installed to the partition plate 31 such that the partition plate 31 is located between the doors 51 and 52 as shown in FIG. 4. Since step portions 53 and 54 are provided as shown in FIGS. 3 and 4, when the VENT door 90 is rotated at the position where the doors 51 and 52 are directed to the upstream side of the partition plate 31, the step portions 53 and 54 are located around the bearing portion 32. This arrangement of the step portions 53 and 54 to the bearing portion 32 functions as a shaft detaching preventing means so as to prevent the shaft 55 of the VENT door 90 from being detached from the opening of the bearing portion 32.

The shaft 55 has a pair of ribs 56 which are located at both end portions of the bearing portion 32. That is, the ribs 56 act as positioning means for restricting the shaft 55 installed to the bearing portion 32 from moving in the axial direction of the shaft 55. This positioning means is not limited to this and may be arranged to provide one rib at the center of the shaft 55 and to form a slit on the arc surface 34 of the bearing portion 32 so that the center rib engages with the slit.

Next, the manner of assembling the partition plate 31 and doors 90 and 95 to the casing 80 will be discussed.

FIGS. 5A to 5D show side views for explaining a method of installing the VENT door 90 to the partition plate 31. In these figures, the positioning ribs 56 are facilitated.

Figure 5A:
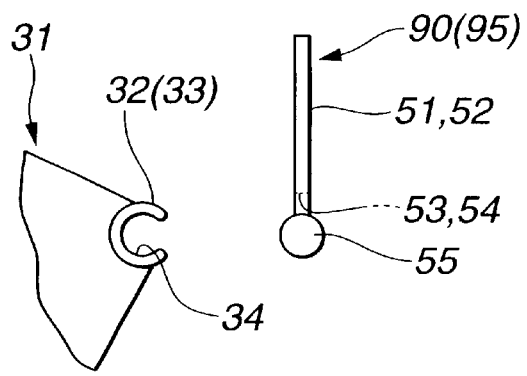
FIGS. 5A to 5D are side views showing an installation procedure of the VENT door to the partition plate.
Figure 5B:
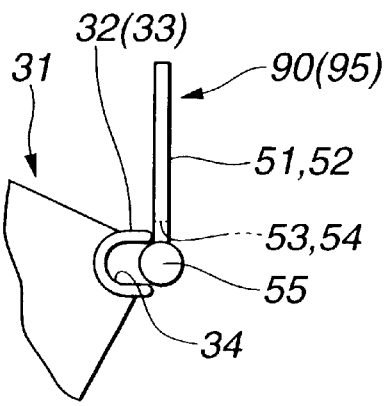
Figure 5C:
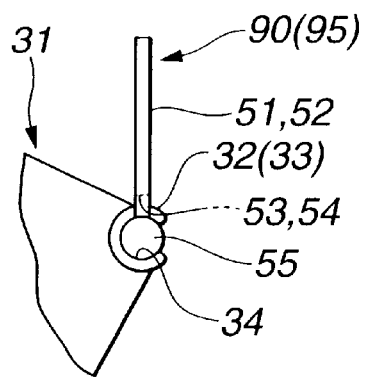

As shown in FIGS. 3 and 5A, the shaft 55 of the VENT door 90 is approached to the opening portion of the bearing portion 32 of the partition plate 31 such that an intermediation portion of the positioning ribs 56 corresponds to the bearing portion 32. Since the arc surface 34 of the bearing portion 32 is formed to have an angle subtended at a center of the arc which angle is greater than 180°, the shaft 55 deforms the opening portion of the bearing portion 32 as shown in FIG. 5B, and is then inserted into and supported to the bearing portion 32 as shown in FIG. 5C. Since the doors 51 and 52 have the step portions 53 and 54 respectively, the doors 51 and 52 do not interference with the bearing portion 32.

Due to the arc surface 34 formed to surround the shaft 55 at the angular range greater than 180°, by inserting the shaft 55 in the bearing portion 32, the shaft 55 is supported to the bearing portion 32 so as not to be detached therefrom without a predetermined force in the axial perpendicular direction. Further, by corresponding the intermediate portion between the ribs 56 with the bearing portion 32 in positioning, the position of the VENT door 90 in the axial direction is easily and correctly determined. Furthermore, it is possible to restrict the movement of the VENT door 90 in the shaft axial direction. Therefore, the assembly operation is further improved. Since the bearing portion 32 has a predetermined length and is formed into a cylindrical shape having a cutout portion, the shaft 55 is stably supported to the bearing portion 32.

Figure 5D:
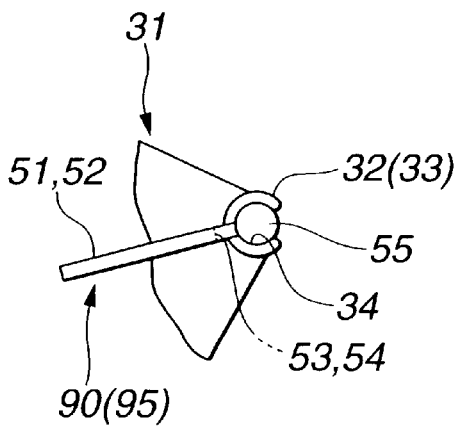

Next, as shown in FIGS. 5D and 4, the shaft 55 is rotated such that the doors 51 and 52 direct to an inner side of the partition plate 31. With this arrangement, the step portions 53 and 54 are faced with the outer periphery of the bearing portion 32 so as to restrict the movement of the VENT door 90 in the direction perpendicular to the shaft axial direction. Accordingly, it is possible to firmly maintain the installation condition of the VENT door 90 to the partition plate 31, and therefore it becomes possible to firmly prevent the VENT door 90 from being detached from the partition plate 31.

Figure 10:
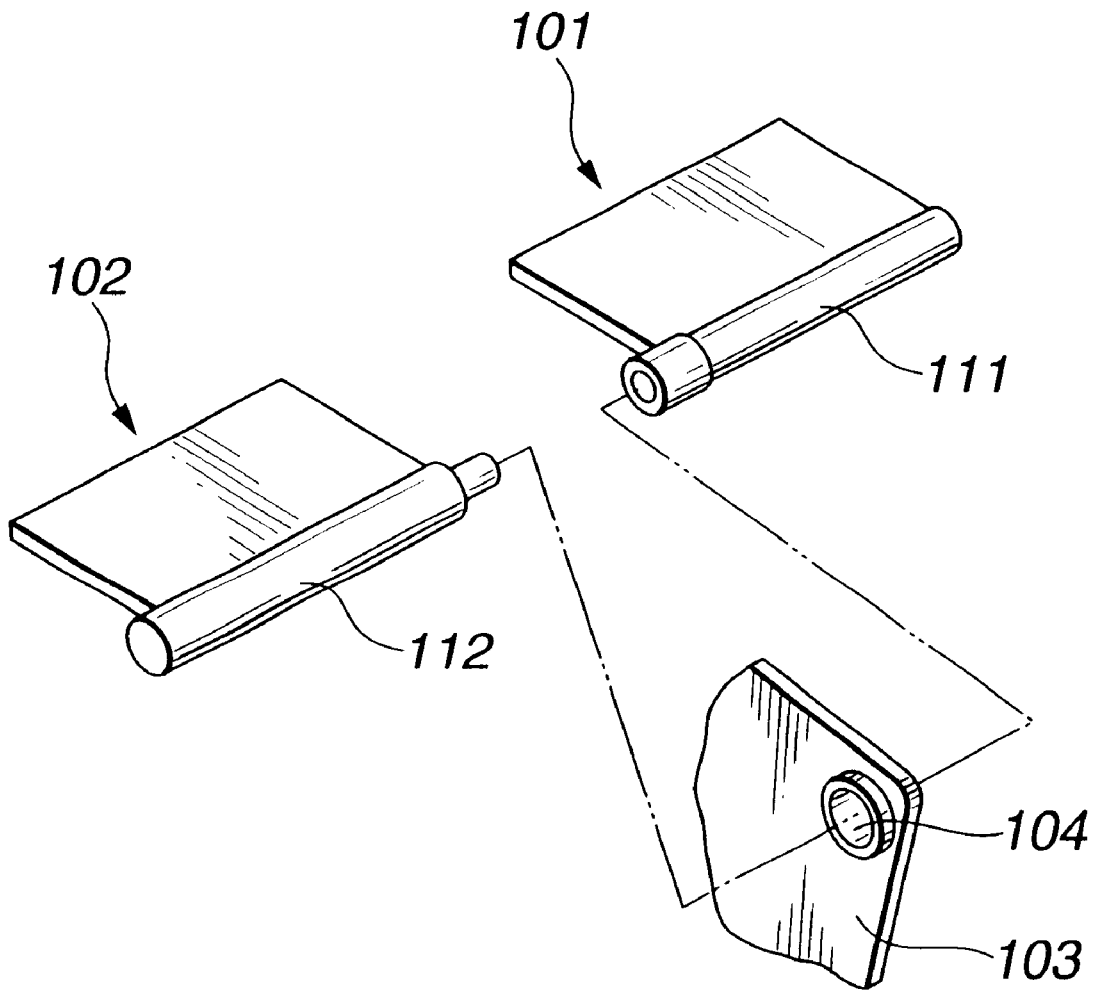
FIG. 10 is an enlarged and exploded perspective view of a conventional door installation structure.

Similarly, the DEF door 95 is installed to the partition plate 31 in the manner as same as that of the VENT door 90. The multiple mode door 10, which is not located at the periphery of the partition plate 31, is installed to the casing 80 in a manner shown in FIG. 10.

After the VENT door 90 and the DEF door 95 are assembled with the partition plate 31, this assembly is assembled to the casing 80 of the air conditioner unit.

At a periphery of the partition plate 31, there are provided the bearing portion 32 formed into a C-shape, the shaft 55 supported by the bearing portion 32, and the VENT door 90 and the DEF door 95 including the plurality of doors 51 and 53 fixed to the shaft 55 so as to be positioned in the passages defined by the partition wall 31 and the casing 80. Therefore, it becomes possible to decrease the number of the parts employed in the air conditioner unit as compared with that in the conventional air conditioner unit, and therefore it becomes possible to decrease the production cost thereof.

Further, the partition plate 31, the VENT door 90 and the DEF door 95 are previously assembled, and the assembled sub unit including the partition plate 31 and the doors 90 and 95 is assembled in the casing 80. Accordingly, the shaft 55 can act as a guide pin in the assembly operation of the casing 80. Therefore, the installation of the partition plate 31 into the casing 80 is simplified and improved in installation efficiency.

Furthermore, the installation of the VENT door 90 and the DEF door 95 does not require to provided a slot slightly greater than a cress section shape the doors 90 and 95 in the partition plate 31. Therefore, it is possible to prevent conditioned air from flow across the partition plate 31. This arrangement enables the air in the plural passages to independently air-condition by each passage.

Figure 6:
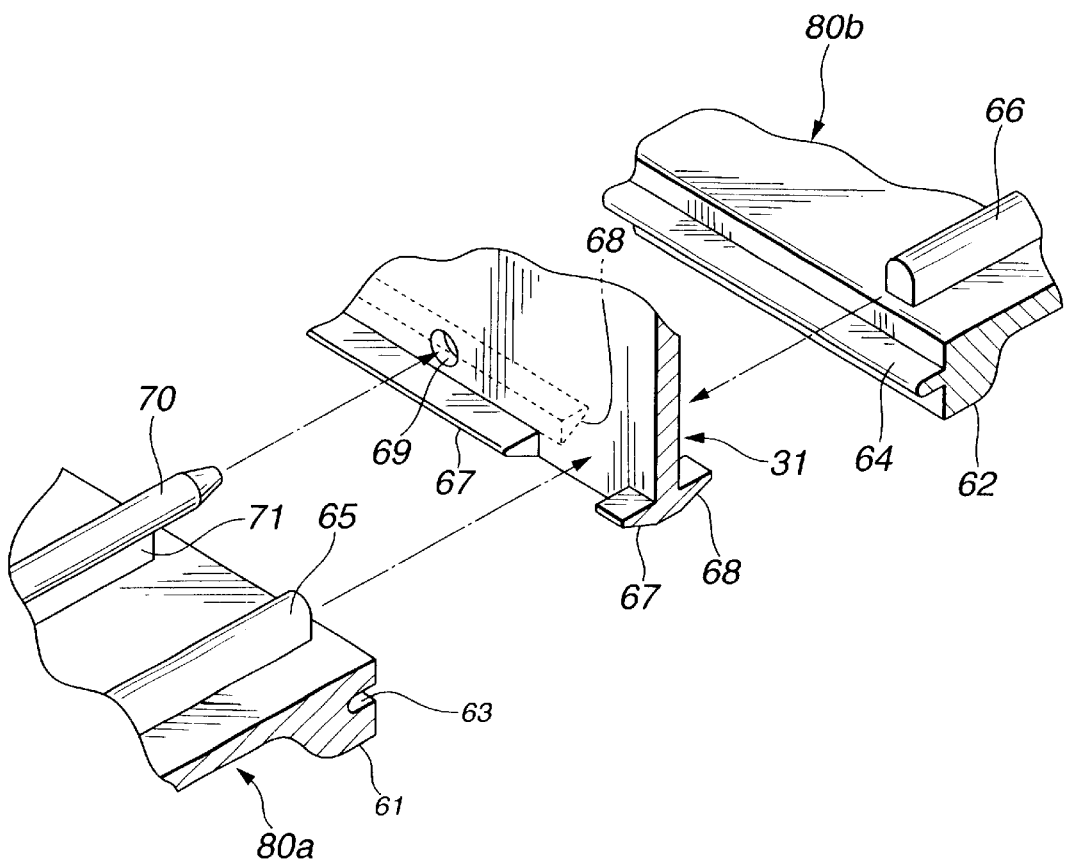
FIG. 6 is an enlarged and exploded perspective view of a part of a pair of casing members and the partition plate.
Figure 7:
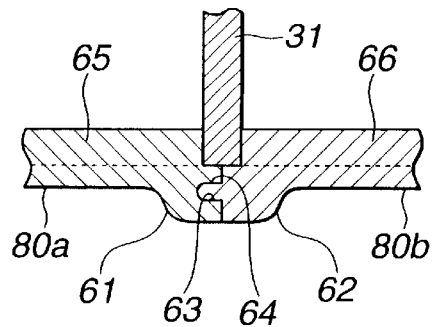
FIG. 7 is a cross-sectional view showing a receiving portion of the partition plate at which supporting portions of the casing members are received.
Figure 8:
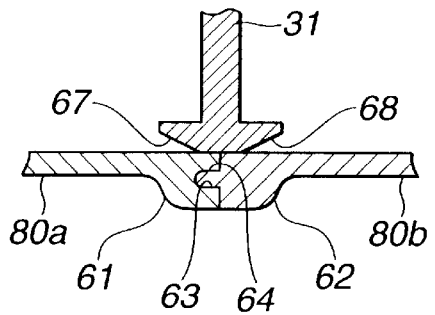
FIG. 8 is a cross-sectional view showing an oblique portion of the partition plate.
Figure 9:
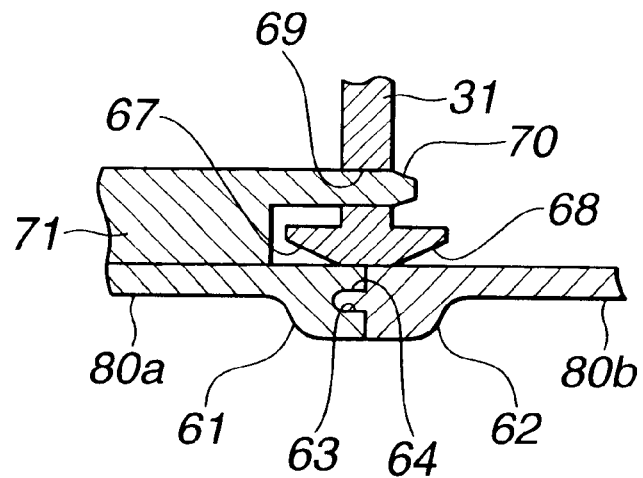
FIG. 9 is a cross-sectional view showing a positioning pin of the casing member and a positioning hole of the partition plate.

FIG. 6 shows the casing members 80a and 80b and the partition plate 31, and FIG. 7 shows case connection portions 61 and 62 for connecting the casing members 80a and 80b. The case connecting portions 61 and 62 include a pin receiving portions formed on the partition plate 31. FIG. 8 is a cross sectional view showing oblique guide portions 67 and 68 which are formed at a lower end portion of the partition plate 31. FIG. 9 is a cross sectional view showing a positioning pin 70 formed on the casing member 80a and a positioning hole 69 formed on the partition plate 31.

As shown in FIG. 6, the casing members 80a and 80b are connected by butt connection. The case connecting portions 61 and 62 formed at the butted end portions of the casing members 80a and 80b are bulged toward the outer side and formed into a flange shape. The case connecting portion 61 has a recess groove 63 which is connected to a projecting bead 64 of the case connecting portion 62. Accordingly, when the casing members 80a and 80b are connected with each other, the projecting bead 64 of the case connecting portion 62 is engaged with the recess groove 63. With this manner, the casing 80 is basically assembled.

Supporting portions 65 and 66 for supporting the partition plate 31 are provided at the end portions of the casing members 80a and 80b. These supporting portions 65 and 66 are corresponding to ejector pin receiving portions for receiving ejector pins during molding. It is of course certain that the supporting portion 65 and 66 are not limited to the ejector pin receiving portions and may be differently provided as ribs or beads of the casing members 80a and 80b.

The supporting portions 65 and 66 are oppositely provided at the casing members 80a and 80b, respectively.

Preferably, a plurality of pairs of supporting portions are provided to the casing members 80a and 80b in view of firmly supporting the partition plate 31. In this embodiment, the supporting portions 65 and 66 are formed at the lower wall portion of the casing members 80a and 80b, they may be formed at the upper wall or side wall of the casing members 80a and 80b.

The casing 80 is assembled by sandwiching the partition plate 31 by the pair of the supporting portions 65 and 66, and by engaging the projecting bead 64 of the connecting portion 62 of the casing member 80b to the recess groove 63 of the case connecting portion 61 of the casing member 80a.

Accordingly, it is possible to assemble the casing 80 of the standard type air conditioning unit even if the partition plate 31 is omitted. Further, by sandwiching the partition plate 31 with the supporting portions 65 and 66, the casing 80 for the independent type air conditioning unit can be assembled. Therefore, it becomes possible to commonly use the casing of the prevent invention as the standard type air conditioning unit and the independent type air conditioning unit. This enables decreasing the projection cost of the air conditioner unit.

Further, since the supporting portions 65 and 66 for supporting the partition plate 31 are provided by utilizing the ejector pin receiving portions for receiving ejector pins employed to release the molded product from a molding die, it becomes possible to suppress the production cost of the air conditioner unit and to easily provide the supporting portions 65 and 66.

Furthermore, during the casing assembly operation, it is unnecessary to sandwich all periphery of the partition plate 31 by means of the casing members 80a and 80b, it becomes possible to easily assembly the casing members 80a and 80b while locating the partition plate 31 therebetween. This improves the assembly performance as to the casing 80.

Figure 11:
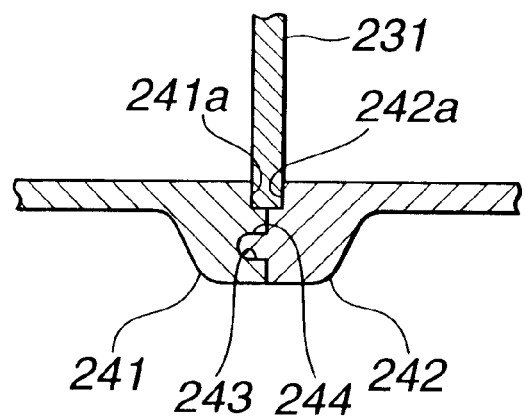
FIG. 11 is a cross-sectional view showing a conventional connecting portion among a pair of casing members and a partition plate.

Further, since it becomes unnecessary to provide the recess grooves 241a and 242a employed in the conventional casing as shown in FIG. 11, the projecting amount of each connecting portion 61, 62 of each casing member 80a, 80b is decreased by the thickness of the recess grooves 241a and 242a. Consequently, it becomes possible to prevent excessively increasing the thickness of the case connecting portions 61 and 62, and therefore the strain caused by the plastic molding is solved. Although FIG. 7 shows the case connecting portions 61 and 62 provided at the outer peripheral portions of the casing members 80a and 80b, the present invention is not limited to this arrangement and may be adapted to casing connecting portions in the casing 80. In case that the casing connecting portions are provided inside the casing 80, it becomes possible to further decrease the thickness at the case connecting portions 61 and 62 as compared with the conventional connecting portions. That is, since the conventional casing connecting portions are arranged to provide recess grooves 241a and 242a as shown in FIG. 11, the arrangement according to the prevent invention can facilitate to excessively project the casing connecting portions. This decreases the thickness of the case connecting portions.

Further, as shown in FIGS. 6 and 8, when the case connecting portions 61 and 62 of the casing members 80a and 80b are connected to both side walls of the partition plate 31 by the butting, the pair of the oblique guide portions 67 and 68 are provided so as to guide the case connecting portions 61 and 62 to the predetermined positions while being in contact with the inner sides of the casing members 80a and 80b. Therefore, it becomes possible to improve the performance of engaging the recess groove 63 and the projection bead 64 for the butt connection between the casing members 80*a* and 80*b*. Although the oblique guide portions 67 and 68 are formed at the lower end portions of the partition plate 31 except for the portion which are received by the supporting portions 65 and 66, it will be understood that the present invention is not limited to this and may be arranged such that the oblique guide portions 67 and 68 may be formed partially or thoroughly.

Further, as shown in FIGS. 6 to 9, a positioning hole 69 is formed at a side surface of the partition plate 31, and a positioning pin 70 is formed at a lower end portion of the casing member 80*a* so as to be inserted to the positioning hole 69. The positioning pin 70 is formed on supporting portion 65 of the ejector pin receiving portion. This arrangement enables the partition plate 31 to be correctly positioned and installed to the casing members 80*a* and 80*b*. In view of the positioning of the partition plate 31, it is preferable that the number of the pairs of the positioning hole 69 and the positioning pin 70 is greater than at least two.

Although the embodiment according to the present invention has been shown and described as to the independent air conditioner unit having the two independent passages defined by dividing the space of the casing 80 by means of the partition plate 31, the invention is not limited to this and may be adapted to an independent air conditioner unit having three or more independent passages divided by two or more partition plates. Further, although the embodiment according to the present invention has been shown and described as to the independent air conditioner unit having right and left independent passages, the invention is not limited to this and may be adapted to an independent air conditioner unit having upper and lower independent passages.

The entire contents of Japanese Patent Applications No. 2000-68923 filed on Mar. 13, 2000 and No. 2000-86804 filed on Mar. 27, 2000 in Japan are incorporated herein by reference.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. A casing unit of an air conditioner for a vehicle comprising:
   a casing comprising a first casing member and a second casing member;
   a partition plate installed in said casing;
   a bearing portion formed at a periphery of said partition plate, said bearing portion having a C-shaped cross section and having an opening; and
   a door unit comprising a shaft and a plurality of doors integral to the shaft, the shaft being rotatably installed to said bearing portion.

2. The casing unit as claimed in claim 1, wherein the bearing portion has an arc surface for supporting the shaft of said door unit, an angle subtended at the center by an arc of the arc surface is greater than or equal to 180°.

3. The casing unit as claimed in claim 1, wherein said bearing portion is cylindrical which extends in a direction perpendicular to a major surface of said partition plate.

4. The casing unit as claimed in claim 1, wherein the doors of said door unit comprise a movement limiting means for limiting a movement of said door unit in a direction perpendicular to an axial direction of the shaft when the shaft is supported to said bearing portion and when said door unit is rotated at a position where the doors are located to sandwich said partition plate therebetween.

5. The casing unit as claimed in claim 1, wherein the shaft of said door unit comprises a positioning means for limiting the shaft from moving in an axial direction of the shaft when the shaft is supported to said bearing portion.

6. The casing unit as claimed in claim 1, further comprising a partition plate supporting means for supporting said partition plate at a predetermined position in said casing.

7. The casing unit as claimed in claim 6, wherein said partition plate supporting means comprises a pair of partition plate supporting portions which are integrally formed with said first and second casing members, respectively, said partition plate supporting portions sandwiching a peripheral portion of said partition plate.

8. The casing unit as claimed in claim 6, wherein said partition plate supporting means comprises a partition plate position hole provided at a peripheral portion of said partition plate and a partition plate positioning pin is provided to one of the first and second casing members, the partition plate positioning pin being inserted to the partition plate positioning hole when said partition plate is assembled with said first and second casing members.

9. A door installation structure in a casing of a vehicular air conditioner unit, said door installation structure comprising:
   a partition plate comprising a bearing portion which is formed into C-shape having an opening, the bearing portion being formed at a periphery of said partition plate, the opening of the bearing portion being opened toward an outside of said partition plate; and
   a door unit comprising a shaft and a plurality of doors integrally fixed to the shaft, the shaft being installed to the bearing portion and rotatably supported to the bearing portion.

* * * * *